(12) United States Patent
Kamavaram et al.

(10) Patent No.: US 11,352,505 B1
(45) Date of Patent: Jun. 7, 2022

(54) METHOD OF MAKING BUOYANCY ADJUSTED MATERIALS AND THEIR APPLICATION THEREOF

(71) Applicant: Oceanit Laboratories, Inc., Honolulu, HI (US)

(72) Inventors: Venkat Kamavaram, Honolulu, HI (US); Vinod Veedu, Houston, TX (US); Ganesh Arumugam, Honolulu, HI (US); Raphael Rodriquez, Honolulu, HI (US); Jacob Pollock, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 0 days.

(21) Appl. No.: 15/601,930

(22) Filed: May 22, 2017

Related U.S. Application Data

(63) Continuation-in-part of application No. 13/951,065, filed on Jul. 25, 2013, now abandoned.

(60) Provisional application No. 62/339,444, filed on May 20, 2016.

(51) Int. Cl.
  *C09C 1/30* (2006.01)
  *C09K 8/62* (2006.01)
  *C09K 8/80* (2006.01)

(52) U.S. Cl.
  CPC .............. *C09C 1/3072* (2013.01); *C09K 8/62* (2013.01); *C09K 8/805* (2013.01); *C09K 2208/10* (2013.01)

(58) Field of Classification Search
  CPC .... C09C 1/3072; C09K 8/805; C09K 2208/10
  USPC ......................................................... 427/212
  See application file for complete search history.

(56) References Cited

U.S. PATENT DOCUMENTS

| 4,493,875 A * | 1/1985 | Beck ..................... C09K 8/62 166/280.2 |
| 8,596,361 B2 * | 12/2013 | Willberg ................ C08K 9/08 166/279 |
| 2005/0028979 A1 * | 2/2005 | Brannon ................. C09K 8/62 166/280.2 |
| 2006/0258546 A1 * | 11/2006 | Brannon ................. C09K 8/80 507/269 |
| 2008/0277115 A1 * | 11/2008 | Rediger ................ C09K 8/805 166/280.2 |
| 2010/0059226 A1 * | 3/2010 | Termine ................ E21B 43/26 166/308.1 |
| 2010/0288495 A1 * | 11/2010 | Willberg ................ C09K 8/80 166/278 |
| 2013/0081812 A1 * | 4/2013 | Green ................... C09K 8/805 166/280.1 |
| 2014/0262293 A1 * | 9/2014 | Song ..................... C09K 8/68 166/308.2 |
| 2016/0137913 A1 * | 5/2016 | Mahoney ............... C09K 8/805 166/280.2 |

OTHER PUBLICATIONS

Mutua et al., Surface Modification of Hollow Glass Microspheres, Materials Sciences and Applications, 2012, 3, p. 856-860 (Year: 2012).*

* cited by examiner

*Primary Examiner* — Tabatha L Penny
(74) *Attorney, Agent, or Firm* — Fresh IP PLC; Clifford D. Hyra; Aubrey Y Chen

(57) ABSTRACT

A method of producing modified buoyancy bodies and particulates involves pre-treating one or more substrate surfaces with acid to activate hydroxyl groups, rinsing the substrate surfaces to remove excess acid, functionalizing the pre-treated substrate surfaces with hydrophilic chemical moieties to provide hydrophilic functionality to the substrate, and attaching chemicals, materials, and/or fillers to the substrate surfaces sequentially to produce bodies and/or particles having modified functional attributes.

15 Claims, 2 Drawing Sheets

METHOD OF MAKING BUOYANCY ADJUSTED MATERIALS AND THEIR APPLICATION THEREOF

This application claims the benefit of U.S. Provisional Patent Application No. 62/339,444, filed May 20, 2016, and is a continuation-in-part of U.S. Nonprovisional patent application Ser. No. 13/951,065, filed Jul. 25, 2013, each of which is hereby incorporated by reference in its entirety.

FIELD OF THE INVENTION

The application relates to methods of coating substrates and particulates to enhance buoyancy, durability and fluid-surface behavior and applications thereof.

BACKGROUND

Industrial and commercial applications involving fluid-particle and fluid-body systems may require durability and/or flotation enhancement to gain system efficiency. Buoyancy gains may increase transport through fluid systems enabling greater efficiency for a variety of applications. Applications may include, but are not limited to, fluid-particle mixing systems in which the particles behave as mixing/dispersion media to blend liquids, medical tracer sensing, material delivery in liquid systems and flow tracking in environmental engineering. Existing methods for enhancing durability and/or flotation are not economical or are ineffective.

Needs exist for improved methods of enhancing the durability and/or flotation of bodies and particles.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

Buoyancy adjusted materials include techniques that may introduce positive, negative or neutral buoyancy to bodies and particles through the use of composite low density coating materials. Enhancement of buoyancy may be gained by coating substrate surfaces with low density layers to displace fluid and enable buoyancy gain for a body or particulate. Requirements for buoyancy adjusted materials include resistance of the coating to high pressures, elevated temperatures, acidic environments, high salinity water, sea water and fresh water.

A new method includes pre-treating one or more substrate surfaces with acid to activate hydroxyl groups, rinsing the substrate surfaces to remove excess acid, functionalizing the pre-treated substrate surfaces with hydrophilic chemical moieties to provide hydrophilic functionality to the substrate, and attaching chemicals, materials, and/or fillers to the substrate surfaces sequentially to produce bodies and/or particles having modified functional attributes. The acid pre-treatment may be performed for 1-2 hours. The rinsing may be performed with water.

The hydrophilic chemical moieties may include a silane coupling agent which creates high density silanol groups on the substrate surfaces. The high density silanol groups may be grafted with the chemicals and/or materials. The materials may be attached to the substrate surfaces using a silane coupling reaction and include nanoparticles, micron particles, solid, hollow, or gas-filled spheres, fibers, and/or other 2D and 3D materials. The hydrophilic chemical moieties may include a highly charged cationic or anionic polymer which give the substrate surfaces high charge density. The highly charged polymer may be grafted with the chemicals and/or materials. The highly charged cationic or anionic polymer may include ammonium, phosphonium and/or sulfonium cations, amine and/or isocyanate groups, and/or cyano and/or carbonyl groups. The chemicals may include surfactant, which may be methylcellulose and/or Tween-80® (a chemical also known by the generic names polysorbate 80 and polyoxyethylene (20) sorbitan monooleate). The hydrophilic chemical moieties include phospholipids, surfactants, amino acids, and/or charged polymers.

The materials may include nanometer- and micron-sized metals, metal compounds, and/or polymers. Such polymers may include silicone, urethane, epoxy, acrylic, phenol formaldehyde and/or cellulose. Such polymers may be combined with the fillers which form part of a polymer matrix and provide additional functionality. Such polymer may be attached chemically, initializing a linkage between the substrate and polymer coating using chemical linkers, which chemically react with the substrate surface and polymer coating to yield a strong bond.

The fillers may include nano- and micron-sized solid, hollow, and/or gas-filled spheres of polymers, silica aerogel, glass and/or quartz.

The method may also include adding the resulting bodies and/or particles to a hydraulic fracturing fluid and inserting the hydraulic fracturing fluid into a hydraulic fracture to hold the fracture open.

The method may also include drying the resulting bodies and/or particles and allowing them to cure.

The resulting bodies and/or particles may be 400-800 microns in their largest dimension, with the hydrophilic chemical moieties and attached chemicals, materials, and/or fillers making up a coating 20-100 microns in thickness.

The chemicals and materials may include polymer and solvent. The solvent may include one or more of acetone, ethanol, hexane, toluene, dimethylformamide (DMF), tetrachloroethylene, tetrahydrofuran (THF) and methyl acetate. In some embodiments, the filler may include acrylic microspheres, the polymer may include epoxy polymer, and the solvent may include acetone. The acrylic microspheres may be 10-50 microns in diameter. The acrylic microspheres may be dispersed in the acetone prior to mixing with the epoxy polymer.

Particles having modified functional attributes may be made by the above-disclosed methods.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

DETAILED DESCRIPTION

Figure 1:
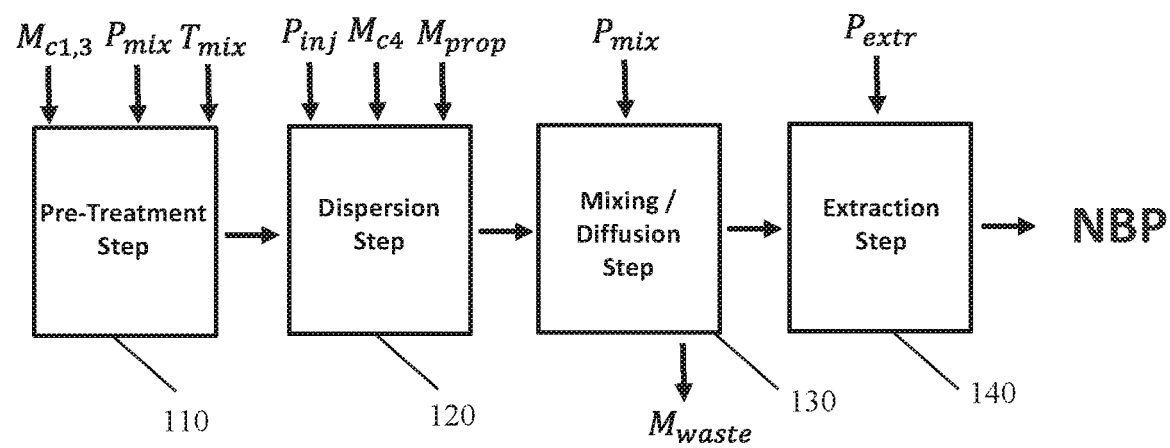
FIG. 1 is a process flow chart illustrating a treatment process, according to an embodiment of the present invention.

Methods of modifying buoyancy for objects and particles with different substrate material will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

The methods of modifying buoyancy of objects and particles may involve several steps e.g., pre-treatment 110, dispersion 120, mixing/diffusion 130 and extraction 140 (FIG. 1). The substrate may be pretreated 110 with acid to activate the hydroxyl groups (—OH) for about 1-2 hr followed by thorough rinsing with copious amounts of water to remove the excess acid. This pre-treatment process is similar to the anodization process described in applicant's prior patent application Ser. No. 13/951,065, filed Jul. 25, 2013 and titled "Method of Manipulating Surfaces for Extreme Wetting Behavior and Their Application Thereof," which is incorporated by reference in its entirety.

The parameters shown in FIG. 1 are defined as follows: $M_{c1,3}$ refers to mass concentrations (wt/%) of components (substrate, chemical and solvent) used in the process step, $P_{mix}$ refers to pressure of mixing, $T_{mix}$ refers to temperature involved in the process, $P_{inj}$ refers to pressure of injection of components, $M_{c4}$ refers to mass concentrations (wt/%) of coating, Mprop refers to mass concentrations (wt/%) of product from previous step, $M_{waste}$ refers to mass concentrations (wt/%) of waste generated and $P_{extr}$ refers to external pressure involved in extracting the final product.

In the next dispersion step 120, the pre-treated substrate may be functionalized with hydrophilic chemical moieties such as a silane coupling agent and/or highly charged (cationic/anionic) polymer. Cationic polymers include polymers containing ammonium, phosphonium and sulfonium cations, and polymers containing groups like amines and isocyantes. Similarly anionic polymers may contain groups like cyano and carbonyl. The silane and charged polymers provide hydrophilic functionality to the substrate, which is required for the subsequent processing step 130. The silane coupling reaction and charged polymer grafting yields high density silanol (X—Si—OH) groups and high charge density, respectively, on the substrate surface. These silanol and charged polymer groups can be grafted with required chemicals or materials for creating a coating on the substrate surface The next step in the coating process may involve a multi-stage mixing and diffusion process 130. The functionalized substrate is treated sequentially with chemicals, materials and polymer. Each treatment step is carried out in a reactor by mixing the components together for diffusion and reaction with the substrate. Each stage creates a unique structure and provides reactive centers to incorporate chemicals or materials in subsequent steps. The chemicals may include surfactants such as methylcellulose, Tween-80® (a chemical also known by the generic names polysorbate 80 and polyoxyethylene (20) sorbitan monooleate), and other similar chemicals. The surfactant lowers the surface tension (or interfacial tension) between a solid and liquid. Surfactant may act as dispersant and wetting agent.

The materials may include nanometer- and micron-sized metals, metal compounds, and/or polymers. The materials that can be attached to a substrate surface using a silane coupling reaction include nanoparticles, micron particles, solid, hollow, or gas-filled spheres, fibers, two-dimensional (2D) like nanoplates, nanosheets, nanowalls, nanodiscs, and three-dimensional (3D) materials such as nanoballs, nanocoils, nanocones, nanopillars and nanoflowers. The materials attached to the substrate act as reactive centers or nucleation sites for subsequent attachment of polymer.

Polymers that may be used for coating the substrate include but are not limited to silicone, urethane, epoxy, acrylic, cellulose, phenol formaldehyde and similar polymers. These polymers may be combined with a filler material which will be part of the polymer matrix and provide additional functionalities, such as low density, high strength, chemical sensing, acoustic signature, infrared signature, florescence and thermal stability. The filler materials may include but are not limited to nano- and micron-sized, solid, hollow, or gas-filled spheres of polymers (mentioned above), silica aerogel, glass and quartz.

The final step of extraction 140 includes a coating curing process, drying process and final separation process to get the final product. In general, polymer coatings are applied onto a surface and the polymer cures on the surface to bond with it. The bonding mechanisms are typically physical, chemical or mechanical bonding with the surface. One approach is chemically bonding various species on the substrate surface, which is significantly different than the adhesively bonded coating that is reported in prior art (e.g., resin coating and low density coatings with fibers or lightweight materials). Chemical bonding involves initializing the linkage between surface and coating using chemical linkers, which chemically react with surface and coating to yield a strong bond. The physically bonded or adhesively bonded coating involves physical attachment of polymer or resin on a surface, thereby it is prone to mechanical stress such as particle friction that would result in peel-off or wear-down of the coating.

The drying process involves heating the product to remove the unreacted chemical and excess solvent used in the dispersion step (120) and mixing/diffusion step (130). The drying step may be carried out in the same reactor used for mixing/diffusion by applying a temperature above the ambient using a heat source or resistive heating methods. The separation step involves separation of product and waste from the reaction mixture using common methods of separation such as gravity separation, sieving and mechanical screening.

A novel approach using silane coupling with filler and using polymer binding for complete coverage and effective binding produces unique microstructure and surface functionality required for modified buoyancy. The morphology and surface properties are determined by the formulation used in the coating process. The formulations of the coating are varied by changing the ratio (weight percent or volume percent) of polymer, filler material and solvent. The solvent can be selected from the group consisting of acetone, ethanol, hexane, toluene, dimethylformamide (DMF), tetrachloroethylene, tetrahydrofuran (THF) and methyl acetate. For example, epoxy polymer, acrylic microspheres (size 10-50 microns) and acetone may form the coating formulation used to coat silica particles (400-800 microns). The filler material, acrylic microspheres, are dispersed in acetone prior to mixing with epoxy polymer. Acetone solvent aids in dispersing the filler microspheres uniformly into the epoxy polymer matrix. Acetone is removed from the coated substrate during the drying step of the process.

The relative composition of polymer and filler determine the viscosity, flow-ability and spray-ability (particle size, shape, mass mean diameter, MMD) which affect the final coating morphology and physical properties. The composition of filler used may be in the range 0-40 wt. % and the remaining 60-100 wt. % may be the polymer. Adding fillers to a neat polymer melt changes its rheology, influencing both the way the melt processes and the properties of the final product. Key properties are filler size and shape, filler concentration, and the extent of any interaction among the particles. The consequence of adding fillers are an increase in polymer melt viscosity due to increased resistance caused by macroscopic clusters of agglomerated filler particles that have significant effect on flow behavior of the mixture. The filled polymer melt viscosity in turn influences the spraying process. Higher melt viscosity results in non-uniform coating and defects (pin-holes, holidays etc.). Hence, the filler composition is designed to yield a final coating on the substrate with uniform morphology and physical properties.

The surface functional groups (polymer or silane) and composite polymer layer yield morphology on a different size scale. The nano- or micro-spheres filled with gas or air are capable of expanding on application of heat, thereby generating a unique microstructure beneficial for changing the interfacial interaction when suspended in industrial fluids or fresh water. In addition to providing unique microstructure, the coating is capable of influencing the average density of the coated particulate or small body. Although the coating with thickness in the range 20-100 microns is extremely thin considering the particle size range of 400-800 micron (20/40 mesh), the coating, with lower-density, plays a role in reducing the overall density of the body/particulate.

Figure 2:
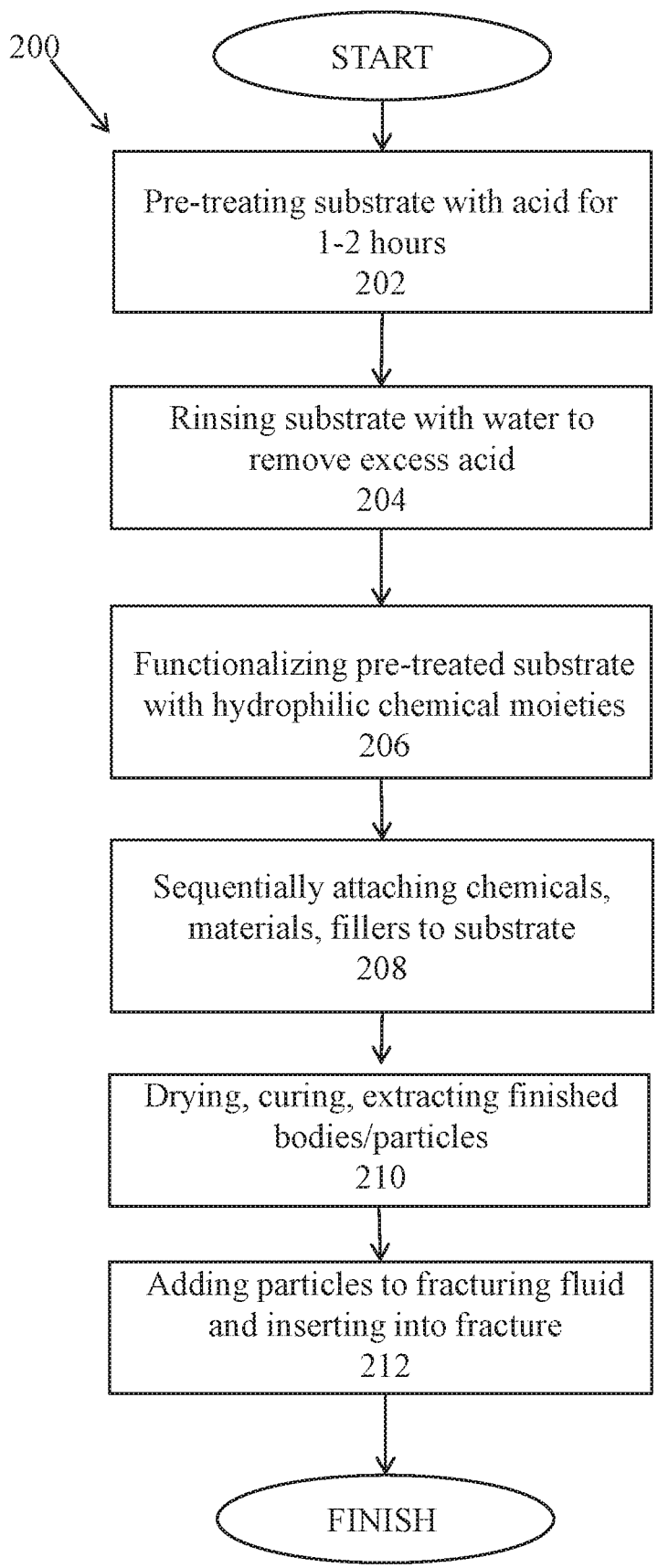
FIG. 2 is a flow chart illustrating a method for producing bodies and/or particles having modified functional attributes, according to an embodiment of the present invention.

FIG. 2 is a flow chart illustrating a method 200 for producing bodies and/or particles having modified functional attributes, according to an embodiment of the present invention. One or more substrate surfaces is pre-treated with acid for 1-2 hours to activate hydroxyl groups 202. The substrate surfaces are rinsed with water to remove excess acid 204. The pre-treated substrate surfaces are functionalized with hydrophilic chemical moieties to provide hydrophilic functionality to the substrate 206. The hydrophilic chemical moieties may include a silane coupling agent which creates high density silanol groups on the substrate surfaces, a highly charged cationic or anionic polymer which give the substrate surfaces high charge density, and/or phospholipids, surfactants, and/or amino acids.

The highly charged cationic or anionic polymer may include ammonium, phosphonium and/or sulfonium cations, amine and/or isocyanate groups, and/or cyano and/or carbonyl groups.

Chemicals, materials, and/or fillers are attached to the substrate surfaces sequentially 208 to produce bodies and/or particles having modified functional attributes. The chemicals may include surfactant, such as methylcellulose and/or Tween-80® (a chemical also known by the generic names polysorbate 80 and polyoxyethylene (20) sorbitan monooleate). The materials may include nanometer- and micron-sized metals, metal compounds, and/or polymers. The materials may include polymer that includes silicone, urethane, epoxy, acrylic, and/or cellulose. The materials may include polymers combined with the fillers, which form part of a polymer matrix and provide additional functionality. The polymer material may be attached chemically, initializing a linkage between the substrate and polymer coating using chemical linkers, which chemically react with the substrate surface and polymer coating to yield a strong bond. The fillers may include nano- and micron-sized solid, hollow, and/or gas-filled spheres of one or more of the group consisting of: polymers, silica aerogel, glass and quartz.

Chemicals and/or materials may be attached to the surfaces by grafting to the high density silanol groups and/or the highly charged polymer. The materials may be attached to the substrate surfaces using a silane coupling reaction and may include nanoparticles, micron particles, solid, hollow, or gas-filled spheres, fibers, and/or other 2D and 3D materials.

The resulting bodies and/or particles are dried and allowed to cure 210. The resulting bodies and/or particles may be 400-800 microns in their largest dimension, with the hydrophilic chemical moieties and attached chemicals, materials, and/or fillers making up a coating 20-100 microns in thickness.

The resulting bodies and/or particles are added to a hydraulic fracturing fluid and the hydraulic fracturing fluid is inserted into a hydraulic fracture 212 to hold the fracture open.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A method for modifying a substrate to be neutrally buoyant in a fluid, the method comprising:
    treating a substrate surface with acid to activate hydroxyl groups, thereby producing a treated surface;
    reacting the treated surface with hydrophilic chemical moieties, thereby producing a reacted surface;
    attaching a plurality of functional groups to the reacted surface; and
    adding one or more polymers and/or one or more fillers to the substrate, wherein the adding further comprises attaching at least one of the one more polymers and/or at least one of the one or more fillers to the plurality of functional groups, thereby resulting in a modification of the substrate to be neutrally buoyant in a fluid,
    wherein the treating with the acid is performed for 1-2 hours,
    wherein the hydrophilic chemical moieties are a plurality of charged polymers without a silane coupling agent,
    wherein the plurality of functional groups is selected from the group consisting of: ammonium cations, phosphonium cations, sulfonium cations, amine groups, isocyanante groups, cyano groups, carbonyl groups, and combinations thereof, and
    wherein the one or more polymers are combined with the one or more fillers to form a polymer matrix, the one or more fillers being up to 40 wt % of the polymer matrix.

2. The method of claim 1, wherein the one or more polymers and/or one or more fillers further comprises nanoparticles, micron-sized particles, fibers, and/or other 2D and 3D materials.

3. The method of claim 1, wherein the one or more polymers and/or one or more fillers is selected from the group consisting of: nanometer-sized metals, micron-sized metals, nanometer-sized metal compounds, micron-sized metal compounds, nanometer-sized polymers, micron-sized polymers, and combinations thereof.

4. The method of claim 1, wherein the one or more fillers comprises at least one sphere.

5. The method of claim 4, wherein the at least one sphere is selected from the group consisting of: a nano-sized solid sphere, a micron-sized solid sphere, a nano-sized hollow sphere, a micron-sized hollow sphere, a nano-sized gas-filled sphere, a micron-sized gas-filled sphere, and combinations thereof.

6. The method of claim 5, wherein the at least one sphere comprises silica aerogel, glass, and/or quartz.

7. The method of claim 1, further comprising:
    adding the neutrally-buoyant substrate to a hydraulic fracturing fluid; and
    inserting the hydraulic fracturing fluid into a hydraulic fracture to hold the fracture open.

8. The method of claim 1, wherein the one or more polymers is selected from the group consisting of: silicone, urethane, epoxy, acrylic, phenol formaldehyde, cellulose, and combinations thereof.

9. The method of claim 1, wherein the adding step further comprises using a solvent.

10. The method of claim 9, wherein the solvent is selected from the group comprising: acetone, ethanol, hexane, toluene, dimethylformamide (DMF), tetrachloroethylene, tetrahydrofuran (THF), methyl acetate, and combinations thereof.

11. The method of claim 10, wherein the one or more polymers and/or one or more fillers comprises a combination of acrylic microspheres, epoxy polymer, and acetone.

12. The method of claim 11, wherein the acrylic microspheres are each 10-50 microns in diameter.

13. The method of claim 11, wherein the acrylic microspheres are dispersed in the acetone prior to mixing with the epoxy polymer.

14. A modified substrate that is neutrally buoyant in a fluid, made according to the method of claim 1.

15. The method of claim 1, wherein the substrate is 400-800 microns in a largest dimension.

* * * * *